(12) United States Patent
Hakim et al.

(10) Patent No.: US 9,746,327 B2
(45) Date of Patent: Aug. 29, 2017

(54) FUSION OF SENSOR AND MAP DATA USING CONSTRAINT BASED OPTIMIZATION

(71) Applicant: TRX Systems, Inc., Greenbelt, MD (US)

(72) Inventors: Daniel Hakim, Silver Spring, MD (US); Christopher Giles, Prince Frederick, MD (US); John Karvounis, Bowie, MD (US); Benjamin Funk, Hanover, MD (US); Jared Napora, Severn, MD (US); Carole Teolis, Glenn Dale, MD (US)

(73) Assignee: TRX Systems, Inc., Greenbelt, MD (US)

( * ) Notice: Subject to any disclaimer, the term of this patent is extended or adjusted under 35 U.S.C. 154(b) by 234 days.

(21) Appl. No.: 13/916,479

(22) Filed: Jun. 12, 2013

(65) Prior Publication Data

US 2013/0332065 A1    Dec. 12, 2013

Related U.S. Application Data

(60) Provisional application No. 61/658,883, filed on Jun. 12, 2012.

(51) Int. Cl.
*G01C 21/20* (2006.01)
*G01C 21/16* (2006.01)
(Continued)

(52) U.S. Cl.
CPC .......... *G01C 21/12* (2013.01); *G01C 21/165* (2013.01); *G01C 21/206* (2013.01);
(Continued)

(58) Field of Classification Search
None
See application file for complete search history.

(56) References Cited

U.S. PATENT DOCUMENTS

| 4,939,663 A | 7/1990 | Baird |
| 6,024,655 A | 2/2000 | Coffee |

(Continued)

FOREIGN PATENT DOCUMENTS

| WO | WO 2012/050932 A1 | 4/2012 |
| WO | WO 2012/072957 A1 | 6/2012 |

OTHER PUBLICATIONS

U.S. Appl. No. 13/566,956, filed Aug. 3, 2012, Karvounis.
(Continued)

*Primary Examiner* — Mussa A Shaawat
*Assistant Examiner* — Abdhesh Jha
(74) *Attorney, Agent, or Firm* — Baker & Hostetler LLP

(57) ABSTRACT

Disclosed herein are methods and systems for fusion of sensor and map data using constraint based optimization. In an embodiment, a computer-implemented method may include obtaining tracking data for a tracked subject, the tracking data including data from a dead reckoning sensor; obtaining constraint data for the tracked subject; and using a convex optimization method based on the tracking data and the constraint data to obtain a navigation solution. The navigation solution may be a path and the method may further include propagating the constraint data by a motion model to produce error bounds that continue to constrain the path over time. The propagation of the constraint data may be limited by other sensor data and/or map structural data.

35 Claims, 8 Drawing Sheets

(51) Int. Cl.
*G01S 5/02* (2010.01)
*H04W 64/00* (2009.01)
*G01C 21/12* (2006.01)

(52) U.S. Cl.
CPC .......... *G01S 5/0205* (2013.01); *G01S 5/0263* (2013.01); *H04W 64/00* (2013.01); *G01S 5/0268* (2013.01)

(56) References Cited

U.S. PATENT DOCUMENTS

| | | |
|---|---|---|
| 6,560,531 B1 | 5/2003 | Joshi |
| 7,299,056 B2 | 11/2007 | Anderson |
| 7,890,262 B2 | 2/2011 | Judd et al. |
| 8,032,153 B2 | 10/2011 | Dupray et al. |
| 8,145,419 B2 | 3/2012 | Onome et al. |
| 8,150,650 B2 | 4/2012 | Goncalves et al. |
| 8,331,335 B2 | 12/2012 | Chhabra |
| 8,462,745 B2 | 6/2013 | Alizadeh-Shabdiz |
| 8,473,241 B2 | 6/2013 | Foxlin |
| 8,538,687 B2 * | 9/2013 | Plocher et al. ............... 701/434 |
| 8,712,686 B2 | 4/2014 | Bandyopadhyay et al. |
| 9,014,903 B1 | 4/2015 | Zhu et al. |
| 2002/0044081 A1 | 4/2002 | Cong |
| 2002/0065603 A1 | 5/2002 | Watanabe et al. |
| 2007/0121560 A1 | 5/2007 | Edge |
| 2008/0077326 A1 | 3/2008 | Funk et al. |
| 2008/0125958 A1 * | 5/2008 | Boss .................... G06Q 10/047 701/123 |
| 2008/0186234 A1 | 8/2008 | Alles et al. |
| 2009/0043504 A1 * | 2/2009 | Bandyopadhyay .... G01C 17/38 701/469 |
| 2009/0235608 A1 | 9/2009 | Kosny et al. |
| 2009/0303120 A1 | 12/2009 | Alizadeh-Shabdiz |
| 2009/0322603 A1 | 12/2009 | Liao |
| 2010/0305845 A1 * | 12/2010 | Alexandre et al. ........... 701/201 |
| 2011/0117924 A1 | 5/2011 | Brunner et al. |
| 2011/0172906 A1 | 7/2011 | Das et al. |
| 2011/0182238 A1 | 7/2011 | Marshall et al. |
| 2011/0238308 A1 | 9/2011 | Miller et al. |
| 2012/0021764 A1 | 1/2012 | Enright |
| 2012/0143495 A1 * | 6/2012 | Dantu ........................ 701/428 |
| 2013/0179067 A1 * | 7/2013 | Trowbridge et al. ......... 701/410 |
| 2013/0278594 A1 | 10/2013 | Kaatz et al. |
| 2013/0293416 A1 | 11/2013 | Waters et al. |
| 2013/0311134 A1 | 11/2013 | Kordari et al. |
| 2013/0331121 A1 | 12/2013 | Bandyopadhyay et al. |
| 2013/0332064 A1 | 12/2013 | Funk et al. |

OTHER PUBLICATIONS

U.S. Appl. No. 13/616,350, filed Sep. 14, 2012, Bandyopadhyay et al.
U.S. Appl. No. 13/916,487, filed Jun. 12, 2013, Funk et al.
U.S. Appl. No. 61/658,883, filed Jun. 12, 2012, Bandyopadhyay et al.
U.S. Appl. No. 61/783,799, filed Mar. 14, 2013, Karvounis et al.
U.S. Appl. No. 61/783,908, filed Mar. 14, 2013, Funk et al.
U.S. Appl. No. 61/792,856, filed Mar. 15, 2013, Funk et al.

* cited by examiner

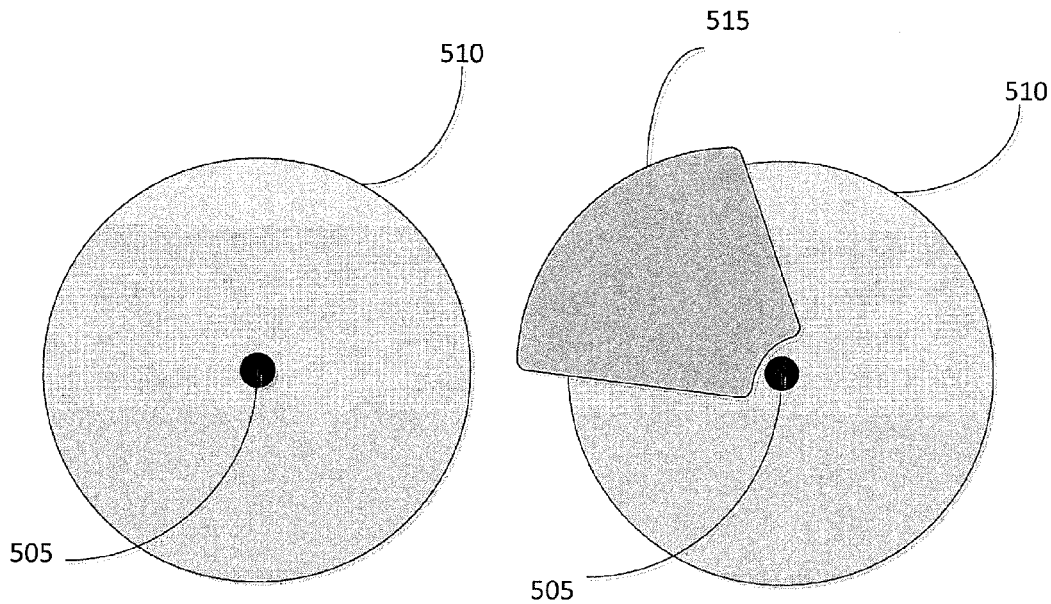
FIG. 5  FIG. 6
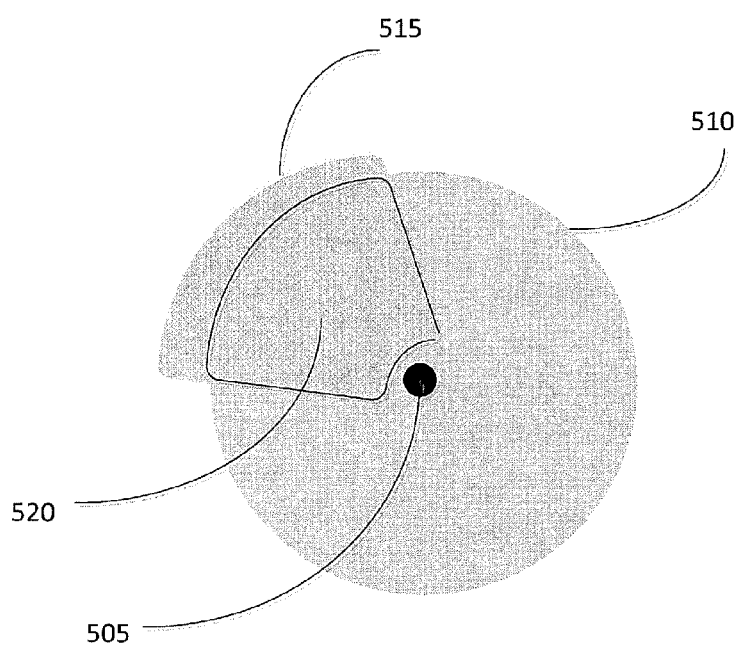
FIG. 7

FUSION OF SENSOR AND MAP DATA USING CONSTRAINT BASED OPTIMIZATION

CROSS REFERENCE TO RELATED APPLICATIONS

This application claims the benefit of U.S. Provisional Application No. 61/658,883, filed Jun. 12, 2012, titled "Advanced Navigation Engine." The contents are hereby incorporated by reference in its entirety.

INCORPORATION BY REFERENCE

This application address concepts discussed in the following previously-filed applications: "Mapping and Tracking System," U.S. patent application Ser. No. 13/566,956, filed Aug. 3, 2012; "Methods Resolving the Elevation of a Tracked Personnel or Assets," U.S. Provisional Patent Application Ser. No. 61/783,799, filed Mar. 14, 2013; "Methods for Improved Heading Estimation," U.S. Provisional Patent Application Ser. No. 61/783,908, filed Mar. 14, 2013; "Method to Scale Inertial Location Data Using Direction and/or Scale Confidence Constraints," U.S. Provisional Patent Application Ser. No. 61/792,856, filed Mar. 15, 2013; "Method For Step Detection and GAIT Direction Estimation," U.S. patent application Ser. No. 13/827,506, filed Mar. 14, 2013; and "System and Method for Localizing a Trackee at a Location and Mapping the Location Using Inertial Sensor Formation," U.S. patent application Ser. No. 13/852,649, filed Mar. 28, 2013. The aforementioned applications in their entirety are incorporated by reference.

TECHNICAL FIELD

The technical field generally relates to a system and method for locating, tracking, and/or monitoring the status of personnel or assets, both indoors and outdoors.

BACKGROUND

Derived relative motion information, which uses a dead reckoning process, is subject to cumulative error. Thus a tracking system relying on dead reckoning alone may have a continuous decrease in accuracy, which makes derived relative motion information not trustworthy over long periods of time. Many other aiding sensors have been considered, including ranging and optical based mapping systems.

The user track and map information that is acquired by use of multiple sensors, is combined so that the map information can compensate for dead reckoning, e.g., inertial drift while user motion/track information can allow perceptually aliased feature information to be disambiguated. Detected map features and ranges can feed into simultaneous localization and mapping (SLAM) algorithms which provide corrections based on the information. The SLAM algorithms are typically implemented using a version of Bayes filter such as a Kalman Filter.

SUMMARY

Disclosed herein are methods and systems for fusion of sensor and map data using constraint based optimization. In an embodiment, a computer-implemented method may include obtaining tracking data for a tracked subject, the tracking data including data from a dead reckoning sensor; obtaining constraint data for the tracked subject; and using a convex optimization method based on the tracking data and the constraint data to obtain a navigation solution.

In an embodiment a computing system used to track a trackee may include a dead reckoning sensor, a processor in communication with the dead reckoning sensor, and a memory coupled to the processor, the memory having stored thereon executable instructions that when executed by the processor cause the processor to effectuate operations. The operations effectuated may include obtaining tracking data for a tracked subject, the tracking data including data from the dead reckoning sensor, obtaining constraint data for the tracked subject, and using a convex optimization method based on the tracking data and the constraint data to obtain a navigation solution.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 5 illustrates an error bound from a constraint, for example range or location, and that has been propagated by a motion velocity model;

FIG. 6 illustrates an error bounds propagated by a velocity model and propagated using path based bounds on heading and scale;

FIG. 7 illustrates the minimized error bound of a velocity error bound propagation and a path error bound propagation;

DETAILED DESCRIPTION

Figure 1:
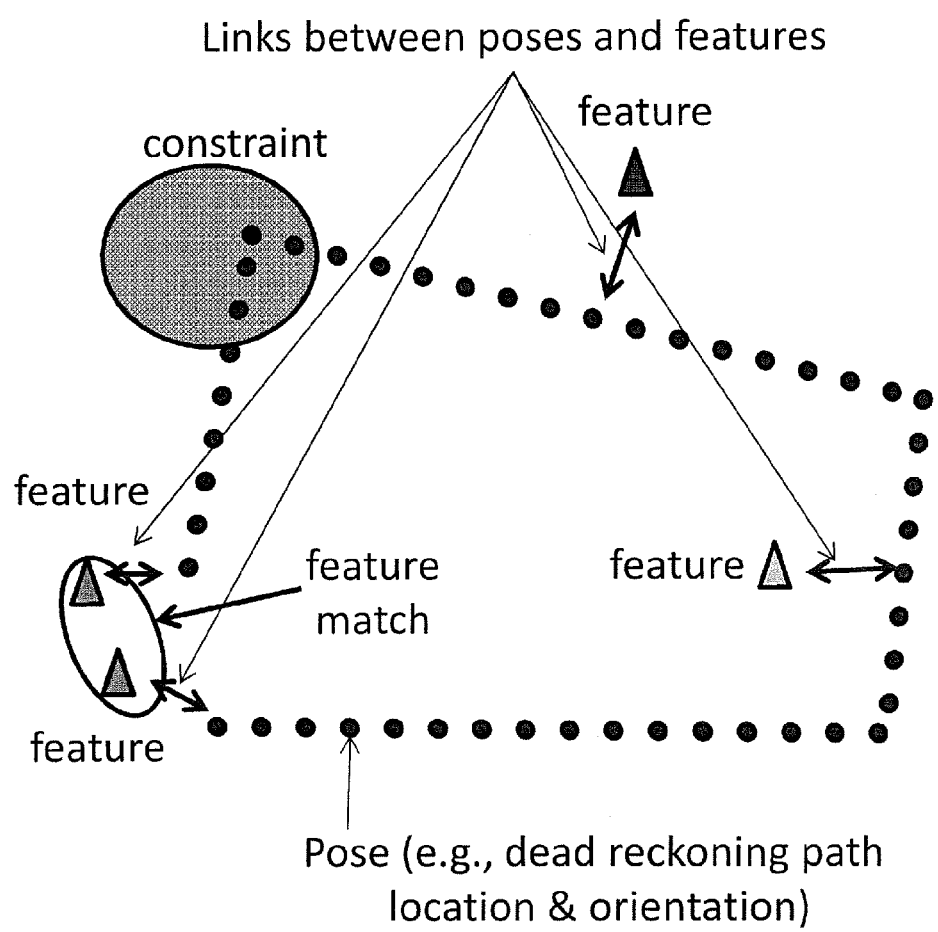
FIG. 1 is an exemplary illustration of a series of poses from the dead reckoning path with features and constraints linked to poses.

Inertial and other dead reckoning sensors are subject to drift and other errors and these are accounted for in the design and operation of navigation methods. A significant problem associated with derived relative motion information, which uses a dead reckoning process, is that it is subject to cumulative error. Thus a tracking system relying on dead reckoning alone may have a continuous decrease in accuracy. Therefore, derived relative motion information may not be trustworthy over long periods of time. While improvements to sensor quality may help, even high quality sensors have limitations in long duration tracking. Methods for error reduction over relatively longer periods are disclosed.

Magnetic sensors, for example, are commonly used to aid inertial dead reckoning systems to improve heading. However, indoor environments and other environments where magnetic heading information is unreliable, present a problem.

Many other aiding sensors have been considered including ranging (e.g., radio frequency (RF), acoustic, and LIDAR), optical, and inertial based feature based mapping systems, among other things. The benefit of the aforementioned aiding sensors is that their information is stationary over time. Feature based systems may suffer from the perceptual aliasing problem, e.g., for a given sensor system, two distinct places (features/landmarks) in the environment may appear the same. Consequently, in order to build reliable maps and allow long duration of tracking, the user track and map information is combined so that the map information can compensate for dead reckoning systems error accumulation while user motion/track information from the dead reckoning system can allow perceptually aliased feature information to be disambiguated.

All of the detected map features and ranges can feed into simultaneous localization and mapping (SLAM) algorithms which provide corrections based on the information. An unbiased map is needed for localization while an accurate pose estimate is needed to build that map. If at the next iteration of map building the measured distance and direction traveled has a budget of inaccuracies, driven by limited inherent precision of the dead reckoning sensors and additional ambient noise, then any features being added to the map will contain corresponding errors. Over time and motion, locating and mapping errors build cumulatively, grossly distorting the map.

Because the position estimates and measurements are imperfect, the solution to the SLAM problem requires the development of a way to update the uncertain geometric or topological environment model based on new observations that maintained consistent interpretation of relations between all of the uncertain features. The SLAM problem is typically solved using a Bayes filter implementation in a standard recursive two-step time-update (prediction), measurement-update form. The derivation of this and similarly many other recursive state estimation filters rely on the Markov assumption, which postulates that past and future data are independent given the current state. Because of concerns for the practical implementation of Bayes filter at this level of abstraction, approximations are often made to control computational complexity, e.g. linearity of the state dynamics, Gaussian noise, etc. The resulting model inaccuracies may induce violations of the Markov assumption leading to a non-optimal solution. A Kalman filter and extended Kalman filters are special cases of a Bayesian filter.

An issue with standard implementations of Bayesian filtering techniques currently used in solving the SLAM problem are that they are not amenable to system reconfiguration. For example, standard implementations often have fixed state vectors which limit the ability to add or drop sensors. They also have significant performance issues with respect to noise model mismatch. Many standard implementations are unable to handle non-Gaussian statistics or non-linear measurement models in a near real time system.

Many aiding sensors of interest do not have Gaussian distribution, which may present a problem when using standard implementations of Bayesian filtering techniques. For example, ranging sensors have non-Gaussian noise in indoor environments where they experience significant multipath and are often in non-line of sight conditions. Optical feature detection and ranging systems have error characteristics which vary nonlinearly as a function of distance.

To add to these issues, the problem of tracking and locating pedestrians presents a set of challenges that is unique relative to most vehicle tracking problems. Human walking has been studied for more than 50 years using a variety of tools. While a variety human motion models are available, the inputs that drive those models are hard to identify. Additionally, the effectiveness of detailed human motion models is questionable as the basis for nonlinear filtering and estimation methods for pedestrian tracking since the tracking system is typically based on measurements at one body location (on the waist or the foot are most common) so has low effective observability. Because of these issues, routine application of standard filtering methods using these models does not provide the same type of benefits that they do in robotic systems where known dynamic models and control inputs are the norm.

The aforementioned issues may be addressed by formulating the location and mapping problem as a constraint based convex optimization problem in which the feature locations and ranges place distance constraints on the path solution. The general approach in convex optimization is to define a convex objective function (i.e., cost) and to minimize the function while enforcing the associated constraints on the function variables. Convex optimization may include efficient methods to solve for the variables and the solution it yields is optimal with respect to the chosen objective function (i.e., cost).

In the convex optimization formulation, there are no assumptions made on error model distributions. In addition there is no Markov assumption. The entire trajectory is maintained. In our implementation, discovered features are linked to the last consecutive pose (a pose is, for example, inertial location and orientation of tracked subject) from which the feature was seen and updated by default each time the historical path is updated. In this way the features do not have to be separately tracked. FIG. 1 is an example. The feature distance constraints are iteratively enforced while minimizing the change in path length and path shape using distance and angle constraints, respectively.

Figure 2:
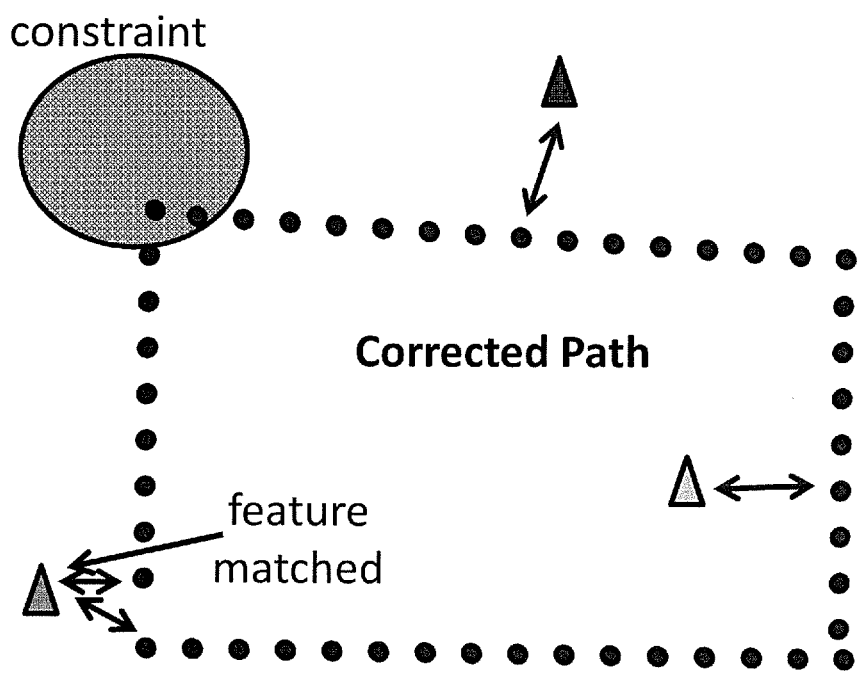
FIG. 2 is an embodiment of a feature match corrected path of FIG. 1.

Sensor ranging data and location data, e.g., GPS location, may be handled as constraints on the subject's track. For example, a ranging sensor provides a range to a known or estimated location and constrains the path to be within the provided range of the location/location estimate; with a sensor that provides a location such as GPS, the path is constrained to fall within the error bound of the given sensor location. Because sensors are handled as constraints, the algorithms are robust to adding and dropping sensor data (as long as there are a set of navigation sensors available that can estimate a path). Also, since the historical data is kept, constraints may be imposed based on the historical data and the path corrected even if there is significant latency. FIG. 2 is an exemplary illustration of a corrected path for FIG. 1. Examples of latency include latency communicating with a remote processor, local processing delay (which could be elective due to limited computing resources) or latency due to incomplete information. In the case of incomplete information, consider a tracked subject A may get a range to tracked subject B, whose geo-referenced location is unknown when the range is taken; tracked subject B may later obtain data that allows them to accurately geo-reference their location and that new information can be used to determine where B was when they ranged to A. Providing this updated information to tracked subject A, even with the delay, may allow them to correct their historical path.

Maintaining the entire path history instead of only the most recent pose has several benefits including providing a directed approach for actively correcting the map and the entire path history when corrections are indicated, for example when a feature is revisited. It also has the benefit of enabling recovery from erroneous corrections. As disclosed herein, a SLAM method (for reference purposes, hereinafter "convex SLAM") has been created to handle pedestrian navigation. Though this SLAM method is also applicable to other platforms such as vehicles; in vehicle problems known dynamic models and control inputs are the norm and Bayesian Filtering methods have computationally efficient mechanism for including this prior known information into the estimate in the prediction step which is why they tend to be favored.

Figure 3:
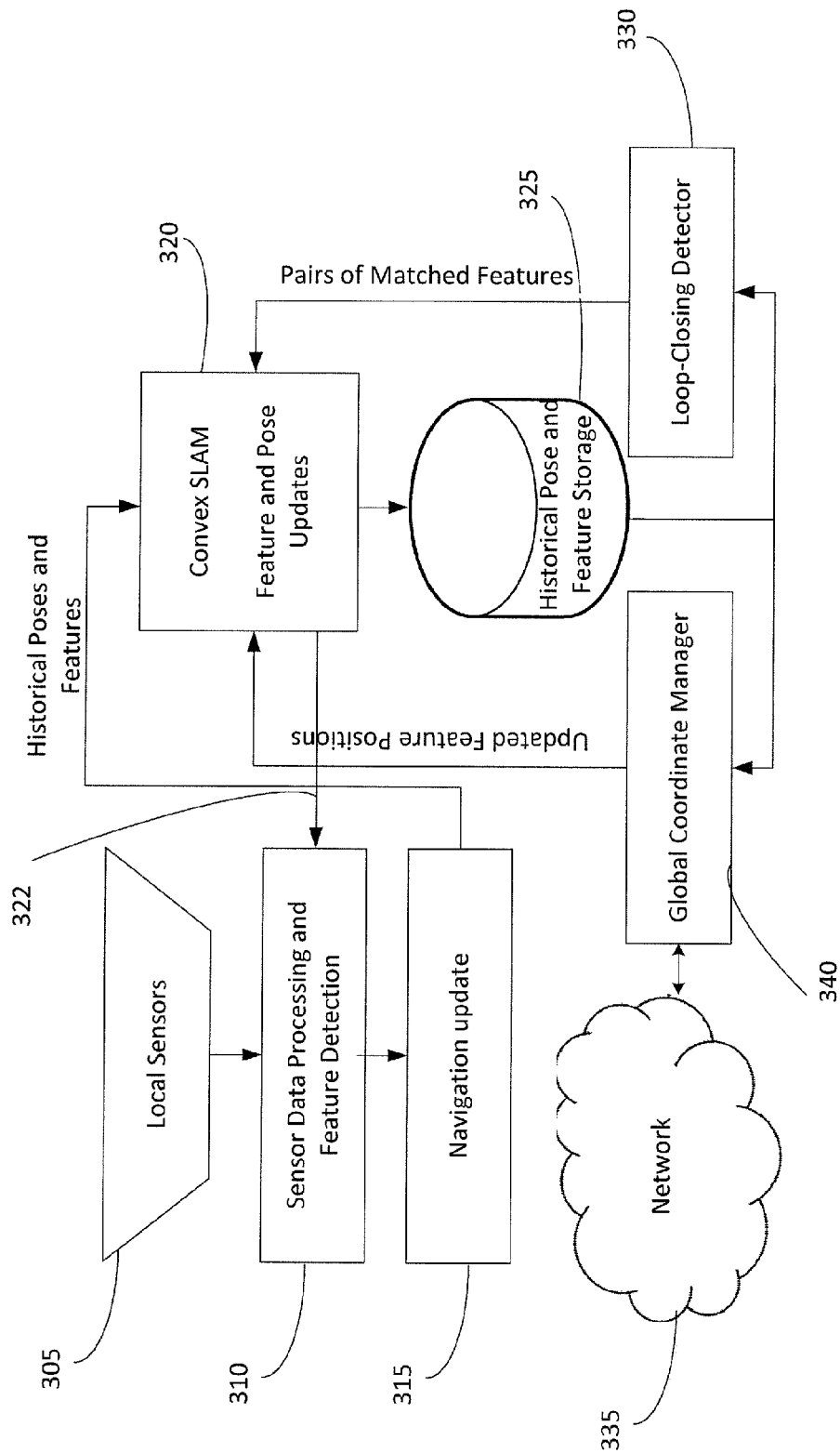
FIG. 3 is an exemplary block diagram illustrating how convex SLAM may be used in the context of tracking a device.

FIG. 3 is an exemplary block diagram illustrating how convex SLAM may be used in the context of tracking a device (a trackee). In an embodiment, at block 305, appropriate local sensors (for example: accelerometer, gyroscope, GPS receiver, magnetic field sensor, barometric pressure sensor, or ranging sensors) are activated and data is received. At block 310, sensor data is received and processed. In addition, features are detected (for example, inertial sensors could detect a stairwell or elevator) and constraints are resolved. With regard to resolved constraints, the bounds in which the path must lie are determined based on, for example, RF ranges, discovered features. Propagation of prior constraints based on motion models and limits to error propagation such as building information could also be completed. Also the convex cost functions are set up.

At block 315, the navigation solution is updated. This could be done using convex optimization (FIG. 4 breaks this out in more detail, the optimization steps 415 and 420 may include several iterations) or by simply appending a corrected inertial path based on parameters from a prior iteration of the solution. Block 305, 310, and 315 usually happen in real-time, which is why a fast inertial update may be considered if there is a lot of data to process. These blocks may process all of the path or only a small portion of the historical path in order to conserve computational resources. If only a portion of the path is processed, some state information may be preserved to maintain the continuity of the prior solution knowledge. For example, what is called the path state herein, the pose information (location and orientation), error bound of the break point and constraints on heading, drift, drift bounds, scale and scale bounds from prior computations (e.g. from block 320). The portion of the path to process can be determined, for example, based on a fixed processing time interval (e.g., 20 minutes), or adaptively, for example based on path or location confidence. It may be desirable, for example, to elect to break the path to save computation. The path may be broken if there is a very good location/path estimate and it provides tight constraints on the path state. At such time, accurately located features may be stored in a global map where these features may not be tied to a user path since the location error is small. The path may also be broken if the dead reckoning path confidence is very low for a period. At such time, the path may be broken and the system may attempt to globally reinitialize using other sensor data. For example, a trackee gets into a car and a pedometer system stops tracking, with GPS being used to track the user in the interim, and the system reinitializing the dead reckoning path when the trackee gets out of the car.

Block 320, may process quality historical feature data and other appropriate information that may be based on data from this tracking device or other tracking devices that have traversed the same path. For example, a stairwell previously visited by this tracking device or other tracking devices may be determined to match the stairwell the trackee is currently in, then prior information on the stairwell may be used. When quality historical features are returned, constraints are added that connect the new feature location to the prior feature location. The portion of the path processed by these blocks is determined by the time interval since the feature was last seen. Block 320 runs navigation methods detailed in FIG. 4. As shown in FIG. 3 by line 322, Block 320 may send last pose, plus updated offset, rotation, scale, and drift parameters to Block 310. In an embodiment, Block 310 may apply it to the inertial path or to initialize optimization when a new constraint is processed. The constraint based optimization enforces the feature match and the intermediate path is corrected, an example is shown in FIG. 1 compared to FIG. 2.

Block 315 may pass along updated navigation information, which may include pose or feature data (and the pose information (location and orientation), error bound of the first point and constraints on heading, drift, drift bounds, scale and scale bounds from prior computations) to block 320 (convex SLAM) for further processing. Block 320 may receive information from 315, historical data from previous processing that was stored in pose and feature storage 325, and historical data associated with other tracking devices from a global coordinate manager 340. Block 325 contains updated path (pose information) and related features. The loop-closing detector 330 applies confidence/quality requirements before information is passed back to block 320 from the feature storage block 325. At block 320, the information may be processed in near real time. At block 340, the global coordinate manager manages the disbursement of updated or corrected navigation information to the convex SLAM algorithm at block 320, and to or from other tracking devices which may communicate via network 335. Network 335 may be a wireless network and include a mesh network.

FIG. 1 is an exemplary illustration of an overview of how sensor data may be processed when using a convex SLAM method during tracking. In an embodiment, block 305, block 310, and block 315 are usually the real-time operations. The sensor data processing and feature detection may be embedded code on the sensor platform, which could be for example, a purpose built worn tracking unit or a cell phone with embedded navigation sensors. The navigation algorithms receive sensor data and features and provide an update in real time. Features and historical pose data are passed to the convex SLAM algorithm which may operate in a lower priority loop for near real time updates. Map management (and sharing of best quality features with other tracked subjects for sharing and asynchronously updating the global map) is provided (e.g. block 340), as well as loop closure (e.g., block 330) detections of matched features and application of constraints to enforce the match when input to the convex SLAM algorithm. The loop-closing detector 330 and Global Coordinate manager 340 may have different confidence/quality requirements (likely the Global Coordinate manager 340 will have tighter requirements because trackee to trackee variation can cause matching errors whereas a single trackee path is more likely to have for example, consistent scale which helps when disambiguating features) before information is passed back to the convex SLAM 320.

Figure 4:
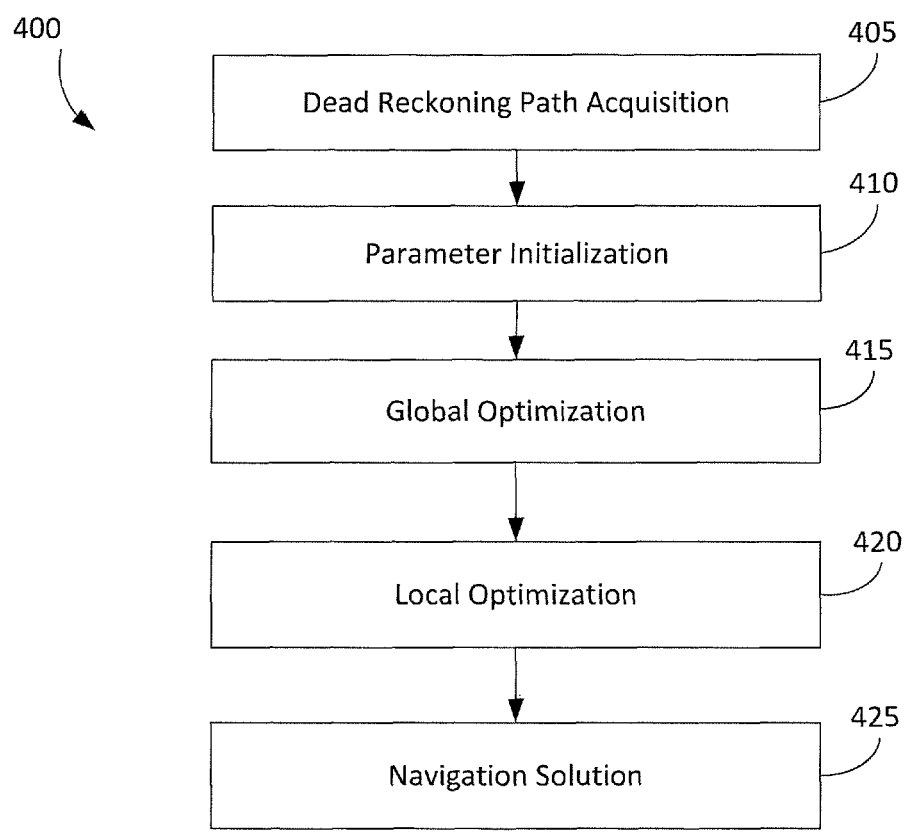
FIG. 4 is an exemplary method for acquiring a navigation solution or enforcing constraints in Convex SLAM.

FIG. 4 is an exemplary method 400 for acquiring a navigation solution (e.g., block 315) or enforcing the constraints in Convex SLAM (e.g., block 320). An overview of the method that may be used in solving for the navigation solution may include dead reckoning path acquisition at 405, parameter initialization at block 410, global optimization at block 415, local optimization at block 420, and ending with the final a navigation solution at block 425. The method 400 shows a simplified structure and may have more complexity in the individual blocks, for example initialization step may include determining certain parameter bounds before global optimization to minimize computational cost. Prior constraints may be propagated based on motion models (for example, human max velocity) and propagation may be limited based on for example, building constraint information. Before any step a method may be used to eliminate constraints for example, because they are outliers or simply to reduce computation when there are many constraints.

At block 405 there is acquisition of the dead reckoning path (herein for example, we discuss an embodiment that takes as input an inertial path). A dead reckoning path may be created from any of a variety of methods, for example, inertial, optic flow, Doppler velocimeter, or some combination of these. In one embodiment, a pedometer based method is used for computation of an inertial path.

At block 410, there is parameter initialization and bounds determination which can be helpful to speed the solution (e.g., when compass data is determined to be reliable). In an example, a compass may be found to be reliable when it provides heading changes that match the rate information returned from a gyro. After the compass is found reliable it can be used to place bounds on the possible headings and to provide an initial drift estimate. New constraints based on for example, RF ranges, or discovered features are resolved to define the bounds in which the path must lie and the costs for violating those bounds, prior constraints are propagated based on motion models and the propagation is limited based on for example, information on a building outline or internal structure such as walls. Ranging and other path constraints may also be used to place bounds on heading and scaling. For example, a series of GPS constraints along a portion of a path (where the error bound received along with the GPS constraint is within a threshold level) may be used to bound the scale and the heading. Parameters obtained from prior iterations of this algorithm may be used as the initialization point when a new constraint is added.

At block 415 there is global optimization. This involves the computation of a globally optimal solution based on the use of convex optimization techniques and a defined convex cost function for parameters offset (initial location), scale, rotation, and drift given constraints from ranging, GPS, discovered map features, user corrections, check-ins, etc. This is described in more detail below.

At block 420 there is local optimization. For polygon or circle constraints that are not met, computation of a local modification of the path can be made between constraints to satisfy these remaining constraints using a physics-based constraint solver. These are standard particle solvers used in computer graphics engines where the length constraints between particles (or path points) can be thought of as linear springs and the constraints on angles can be thought of as torsional springs. In this way the path is similar to a rubber band that is stretched to satisfy the constraints. This is described in more detail below.

With regard to local optimization, in an embodiment an inertial path is allowed to stretch or shrink in length between points with the cost increasing as a function of the change in length (linear spring constant) enforcing the goal of maintaining the length as close as possible to the original length. The angles between path points are tightly maintained (very high torsional spring constant). This restriction is based on the knowledge that the gyro heading is has low error over the short term so these heading angles should be essentially correct and therefore not distorted. The local optimization can be terminated when the constraints are all solved or when it reaches a limit on the number of iterations.

Before the local optimization is completed, a median (or other) filter may be used for removal of the outliers caused by sensor errors. If x is the amount by which the constraint is not satisfied, the median absolute deviation (MAD) is defined as the median of the absolute deviations from the median:

$$\mathrm{MAD}(X) = \mathrm{median}_{x \in X}(|x - \mathrm{median}(X)|)$$

As a rule of thumb, the median and MAD are typically not affected by outliers unless more than 50% of the data are outliers, whereas the mean and standard deviation may be affected by a single outlier. The filter excludes features outside some fixed number of MADs from the median. Theoretically, with any nicely distributed data, a single MAD away from the median in either direction will bound 50% of the data. With a Gaussian distribution, two MADs will bound about 82% of the data. Three MADs are nearly equivalent to two standard deviations under a Gaussian distribution, bounding about 95% of the data. In this embodiment, points within 1 MAD are considered.

Ranging, GPS, given and discovered map features (e.g. stairwells, elevators, and hallway intersections), user corrections, check-ins, and other sensor and map information all place constraints on the path that are defined by a circle or polygon. The center of the circle or polygon is at the estimated location of the feature, range origin, or the like and has a radius defined by the error bound. Other map features such as hallways and walls provide a bound on the propagation of constraints over time that is described in more detail below.

While there are no constraints on the types of error models, sensor error distribution can significantly contribute to a good navigation solution. The goal is to have a bound that encompasses as close to 100% of the points as possible. This is not practical, which is why a step in inserted to remove outliers before enforcing all constraints in the local optimization step.

The error circles from various sensors may be combined to form polygons. This geometric representation allows intersections to be efficiently computed. The bounds created are a mechanism for constraining location error. This error bound may be combined with inertial path data to constrain the path.

For ranging data, the estimated or known location of the ranging source defines the circle center and the constraint is obtained by adding the uncertainty in the location to the received range measurement. Here, it is assumed that ranging measurements are greater than the actual measurement and not less. This is not true for all ranging sensors.

GPS error bounds reported by sensors typically give an error standard deviation measure that indicates 67% of the time, it is expected that a tracked device is within the error bound relative to the reported location. Systems may also report a circular error probable (CEP) which gives a bound for only 50% of the time. In an embodiment, three times the error bound may be used, which relies on the three-sigma rule which states that nearly all values lie within 3 standard deviations of the mean in a Gaussian distributed data set. GPS does not have a Gaussian distribution in urban areas or near buildings.

These constraints may have error bounds defined by a user when the check-in are created. In another embodiment, the constraint error bounds may be defined automatically based on the zoom level of the map in order to make corrections when the location of the user is indicated (e.g., selected on a map).

In pre-mapped buildings the error bound may be defined by the size of the building feature and the accuracy with which the building feature location is known. If the building feature is discovered by the navigation system, then the error bound is a function of a location estimate of the person at the time the building feature was discovered.

The error circles from various sensors may be combined to form polygons. Error bounds may be propagated based on a model of human motion. For example, computing the maximum distance a user could have traveled since the range was received based on the assumption of a maximum velocity could be used to propagate the error bound in all directions. Another possible method would include combining human motion model with measured sensor data, for example, using a combination of the time elapsed assuming a maximum velocity and the computed distance traversed based on the inertial sensors. This bound would take into account the heading and scaling bounds similar to what is shown in FIG. 5. For example, in FIG. 5, a tracked device may have an estimated initial point at circle 505 with an estimated velocity error bound by circle 510. In FIG. 6, additional information regarding the estimated inertial path error bound by shape 515. In FIG. 7, considering velocity error bound by circle 510 and inertial path bound by shape 515, the minimized error for the location of the tracked device is bound by shape 520.

Figure 8:
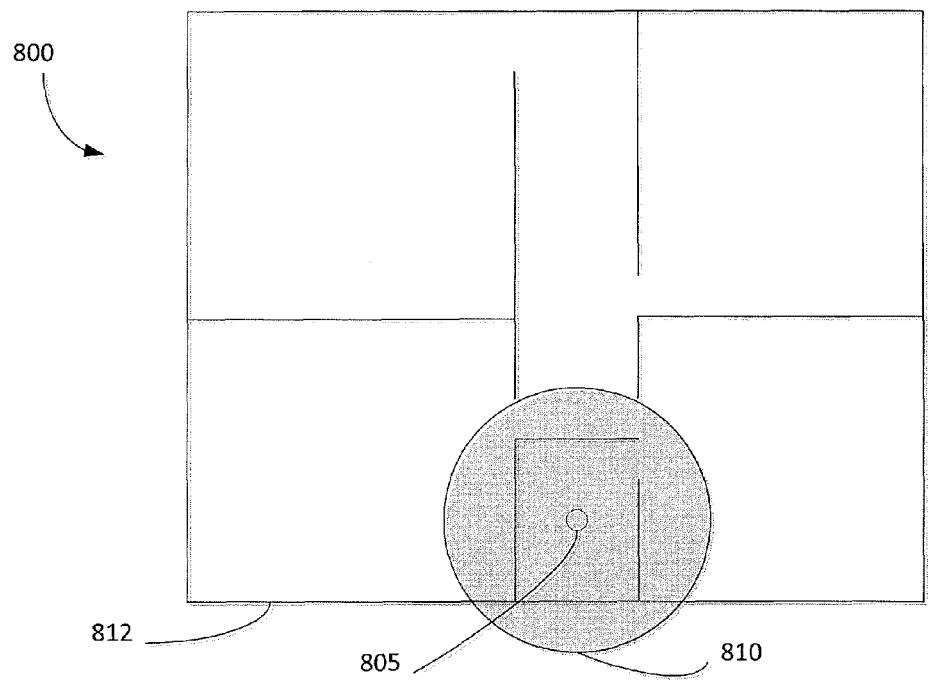
FIG. 8 is an exemplary illustration of a user with a tracking device as shown on a building floor plan.
Figure 9:
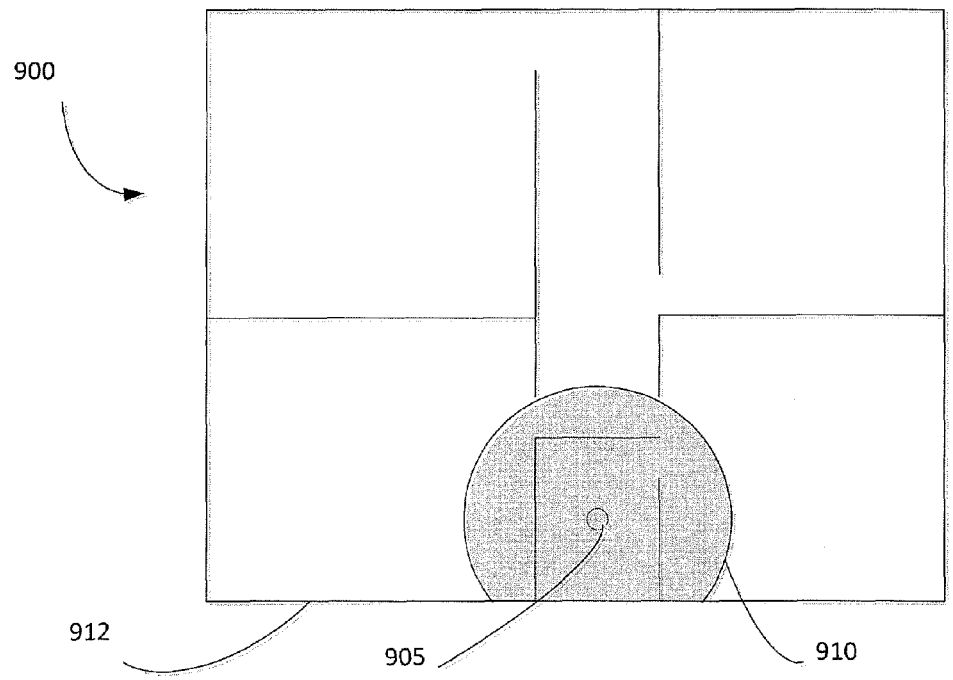
FIG. 9 is an exemplary illustration of error propagation bounded by a building outline.

The size of the bounds can be reduced, if given additional information during the propagation step. For example, if it is known that a user of a mobile device is indoors (this can be determined using sensor data), the error may be bound based on the building outline. FIG. 8 is an exemplary illustration of a user with a tracked mobile device and an associated building floor plan. In FIG. 8, a tracked mobile device carried by a user has an estimated location of 805 and error circle of 810. The error circle 810 stretches beyond the indoor walls and the outline wall 812 that marks the outside of building 800. In FIG. 9, a tracked mobile device carried by a user has an estimated location of 905 and error boundary of 910. The error boundary 910 stretches beyond the indoor walls, but does not stretch beyond the outline wall 912 that marks the outside of building 900.

In the examples shown in FIG. 8 and FIG. 9, there results in an error bound that is the intersection of a circle as well as a building polygon. In implementing this for some building outlines, the error bound computed remains correct, but it may not be convex. In order to be assured of a globally optimal solution, in step 415 of FIG. 4, the constraints must be convex. By computing a convex hull, it is possible to use the building constraints to obtain a more precise bound, but the solution may not respect the walls that fall within the convex hull of the propagated bounds. In step 420 of FIG. 4, convex polygons are not required, so the local optimization will correct the solution to remain in the bounds.

Figure 10:
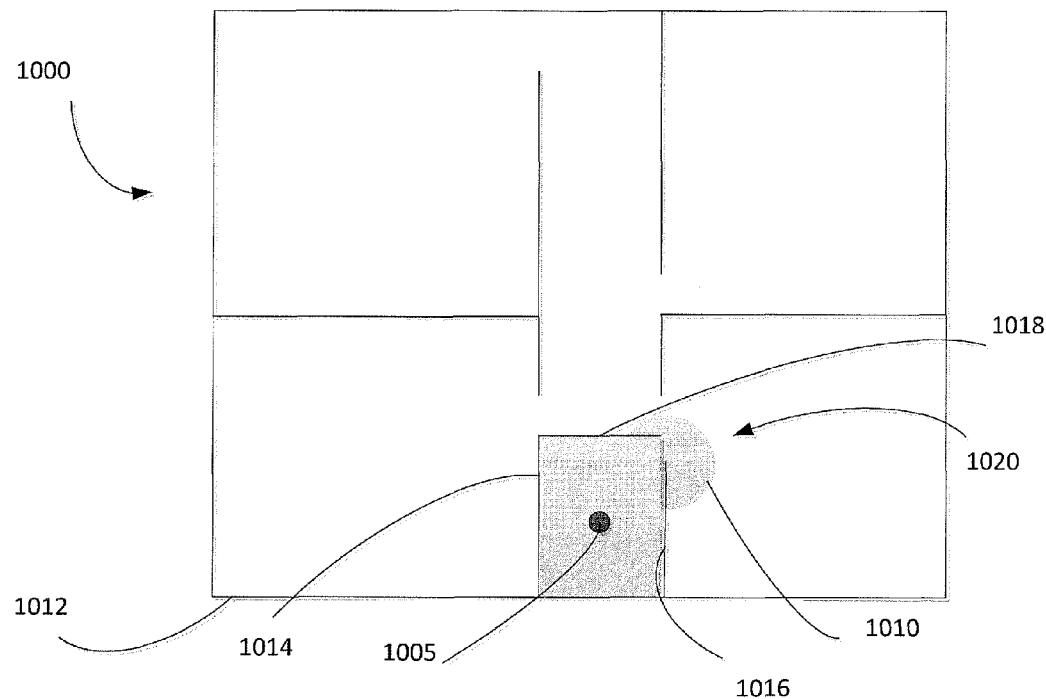
FIG. 10 is an exemplary illustration of error propagation bounded by walls.

In FIG. 10, a tracked mobile device carried by a user has an estimated location of 1005 and shaded error boundary of 1010. The error boundary 1010 does not stretch beyond the outline wall 1012 that marks the outside of building 1000. In addition, the error boundary 1010 does not stretch over or through the indoor walls 1014, 1016, and 1018. There is a convex flood area 1020 that passes around the walls and into the adjacent room and hall. A building can be a relatively large area, but using walls to restrict the propagation, forces a more complex representation of error bounds. In step 415 of FIG. 4, the constraints must be convex. By computing a convex hull for this step, it is possible to use the building constraints to obtain a more precise bound, but the solution may not respect the walls that fall within the convex hull of the propagated bounds. In step 420 of FIG. 4, convex polygons are not required so the local optimization will correct the solution to enforce that it remains in the computed error bounds shown in FIG. 10.

The proposed approach for bounding error by walls and using a convex hull, as illustrated in FIG. 10, allows new information to be ingested by a navigation system. While the necessary propagation may be performed directly on raster floor-plan images, such partial flood filling operation may not be performed efficiently. A more efficient mechanism for propagating the bounds may include a geometric representation of the building structure. The walls of the building may be represented as line segments and the intersections. Because the walls are uniformly presented as segments we are able to stored them in a standard linked data structure in a way that allows for quick traversal between edges and vertices due to the explicitly linked structure of the data storage.

In order to perform partial flood filling, as shown in FIG. 10, there is an operation that allows a polygon to be constructed that is visible from any point in the building. In addition, there is an operation that allows walls to be clipped away within the original ranging distance when performing the method. Both of these operations may be done approximately and somewhat inefficiently using a KD-Tree, QuadTree, or BSP Tree.

Below is one embodiment of a function that turns a range into an error bound that takes walls into account. A range is defined as Center, Radius, Propagated Radius (C, R, PR), where the ranges are propagated similarly as discussed herein.

ExpandBoundsWithWalls(C, R, PR)

```
{
  If (PR == 0)
    return EmptyPolygon
  Polygon visible = FindVisiblePolygon(C, R)  //Cacheable for R == 0
  Polygon inRange = intersection(visible, Circle(C, PR))
  foreach Vertex V in visible
  {
    Polygon result = ExpandBoundsWithWalls(V, 0, (PR − (dist(C, V)))
    inRange = Union(inRange, result)
  }
  return inRange
}
```

Figure 11:
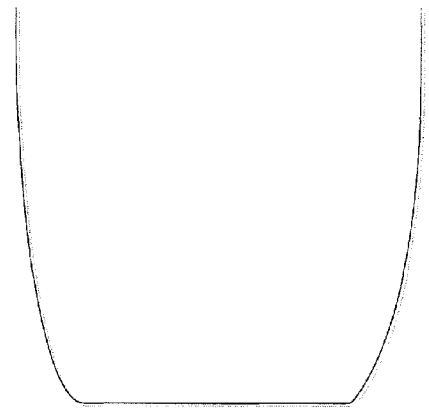
FIG. 11 shows an exemplary shape of the convex cost function where the cost is defined to be zero if the constraint is satisfied and can grow outside of that region.

The global optimization method includes computing the distance between dead reckoning path point and constraint for each point/constraint pair. The cost function is defined to be zero when the constraints are met, and grow as a function of the distance from the constraint, in the embodiment described herein, distance squared is used. FIG. 11 shows an exemplary shape of the convex cost function where the cost is defined to be zero if the constraint is satisfied and can grow outside of that region.

There are multiple methods available for solving convex optimization problems. In an embodiment, the optimization may be solved using an adaptive gradient descent method until the cost is zero, stops decreasing, or a max number of iterations have been completed. The parameters may be solved all at once or in a particular order, for example 1—translation, 2—rotation; and 3—scale.

In the aforementioned embodiment, each time cost is non-zero, a derivative is computed with respect to each of four parameters: x translation, y translation, rotation, and scale. In an embodiment 2-D (x,y) offset can be solved and the elevation (z) offset may be solved for separately. Solving for the 3-D offset would be an extension of this method. See below for details of the 2-D derivations.

TABLE 1

| path point | $P = (P_x, P_y)$ |
|---|---|
| related constraint circle center | $C = (C_x, C_y)$ |
| nearest point on constraint polygon | $N = (N_x, N_y)$ |

The parameters for translation, rotation and scale are denoted in Table 4.

TABLE 2

| translation | $T = (T_x, T_y)$ |
|---|---|
| rotation | $\theta$ |
| scale | $S$ |

The parameters modify the path by the following equation:

$$\text{Path} = S \begin{bmatrix} \cos(\theta) & \sin(\theta) \\ -\sin(\theta) & \cos(\theta) \end{bmatrix} P + T.$$

The cost and related derivatives for each polygon and circle constraint used in the gradient decent algorithms are shown in Table 3.

TABLE 3

| Convex Polygon | Circle |
|---|---|
| $\text{Cost} = \|P - N\|^2$ | $\text{Cost} = (\|P - C\| - \text{MaxDist})^2$ |
| $\dfrac{\partial \text{Cost}}{\partial T_x} = 2(P_x - N_x)$ | $\dfrac{\partial \text{Cost}}{\partial T_x} = \left(2 - \dfrac{2\text{MaxDist}}{\|P - C\|}\right)(P_x - C_x)$ |
| $\dfrac{\partial \text{Cost}}{\partial T_y} = 2(P_y - N_y)$ | $\dfrac{\partial \text{Cost}}{\partial T_y} = \left(2 - \dfrac{2\text{MaxDist}}{\|P - C\|}\right)(P_y - C_y)$ |
| $\dfrac{\partial \text{Cost}}{\partial \theta} = \dfrac{-2(P_y - T_y)(P_x - N_x) +}{2(P_x - T_x)(P_y - N_y)}$ | $\dfrac{\partial \text{Cost}}{\partial \theta} = \left(\dfrac{-2(P_y - T_y)(P_x - C_x) +}{2(P_x - T_x)(P_y - C_y)}\right)\left(\dfrac{\|P - C\| - \text{MaxDist}}{\text{MaxDist}}\right)$ |
| $\dfrac{\partial \text{Cost}}{\partial S} = \dfrac{\begin{array}{l}2(P_x - T_x)(P_x - N_x) + \\ 2(P_y - T_y)(P_y - N_y)\end{array}}{S}$ | $\dfrac{\partial \text{Cost}}{\partial S} = \left(\dfrac{\begin{array}{l}2(P_x - T_x)(P_x - C_x) + \\ 2(P_y - T_y)(P_y - C_y)\end{array}}{S}\right)\left(\dfrac{\|P - C\| - \text{MaxDist}}{\|P - C\|}\right)$ |

Each parameter may be updated by weighted sum over all constraints of the derivatives for the respective parameter. The weights may reflect the adaptive step scale value or a confidence or priority measure on the constraint. For example, constraints created by GPS measurements may have a different weighting than user corrections. The derivatives calculation can be repeated until cost is zero, cost stops decreasing, or 1000 iterations, for example.

The drift is a nonlinear parameter. The heading drift if stated typically in degrees (or radians) per second. The drift may be applied (or removed) from path data by rotating the path over each time step by the drift over that time step. In this embodiment, the optimal drift is selected by computing the cost for a fixed number of drift values within the drift bounds set in the parameter initialization step. The minimum across these computed drift values is selected. If two drift values have the same cost, the drift with the least magnitude is selected. In this embodiment, 51 was selected as the fixed number of drift values to generally give adequate heading refinement from the compass initialized drift value which can be very noisy in buildings.

The path point, related constraint center or nearest constraint polygon point is as denoted in Table 3.

As the number of path constraints grow, so does the computational complexity. Multiple methods may be created to eliminate constraints that do not provide information or provide marginal information. In an embodiment, this can be done by eliminating constraints that do not contribute to the final error bound polygon at a particular point. For example, if there is a constraint of 1 meter from a ranging anchor and a GPS constraint of 10 meters at the same point, the GPS constraint becomes irrelevant. In another example, you may receive a GPS constraint once per second outside. If GPS is good, e.g., as it should be in a field, then you could walk the length of the field receiving a 2 meter constraint every second. Assuming the inertial path is good (you are not missing steps.), it is likely "good enough" to have a constraint at each end of the field. It is not necessary to keep using all the constraints, but just the first and last as the tracked subject moved along.

A tracking device may include a ranging sensor. RF ranging sensors have highly non-Gaussian properties in harsh multipath environments which frustrates integration into filters that have Gaussian assumptions on error distributions. The constraint based optimization solution described herein does not make assumptions on the expected error distribution of the sensors. Instead it uses ranging sensors to impose constraints on the tracked subject's trajectory. Ranging constraints from single or multiple sources may provide frequent input to limit the solution space. Even tracking devices that are close together may receive varying ranging measurements due to multipath and signal blockage from others in the vicinity, the body of the person using the tracking device, or other carried equipment. This type of ranging error may be difficult to predict.

The disclosed constraint based optimization solution is able to support collaborative navigation based on real-time ranging corrections (person to person, person to anchor/base station) using embedded chirp spread spectrum time of flight ranging (e.g., short range of approximately 50 meters) to significantly improve tracking performance. Ranging to fixed anchors and person to person (i.e., tracking device to tracking device) is used for automatic initialization (as an alternative to GPS) when at least one global location is known. Person to person ranges provide continuous navigation corrections to keep team members together and improve the overall navigation solution and provide relative (person to person) location accuracy that usually does not degrades over time.

A test course was traversed in a multi-story office building of steel and concrete construction with the system discovering map features as users walked, rode elevators, and traversed stairs—with no assistance from preinstalled infrastructure. Over several trials the tracked locations were on average accurate to within 3.5 meters throughout the entire course. The path, track, and elevation provided location information for personnel being tracked, and the system visually showed the location and tracked in 3 dimensional space.

Another test course was traversed in an underground test facility where there were at least 5 persons being tracked throughout the facility. A mesh communications network was set up using radios at multiple points. Navigation system initialization was performed automatically using a combination of GPS, which was available outside of the structure and ranging anchors, which where were placed at three known locations outside. Ranging anchors were "dropped" as part of the mission scenario at each of three key network points. The locations of interior points were unknown to the navigation system so the dropped ranging anchor locations were estimated by the navigation system.

Without in any way limiting the scope, interpretation, or application of the claims appearing herein, a technical effect of one or more of the example embodiments disclosed herein is to provide adjustments to navigation solutions based on using convex optimization.

Figure 12:
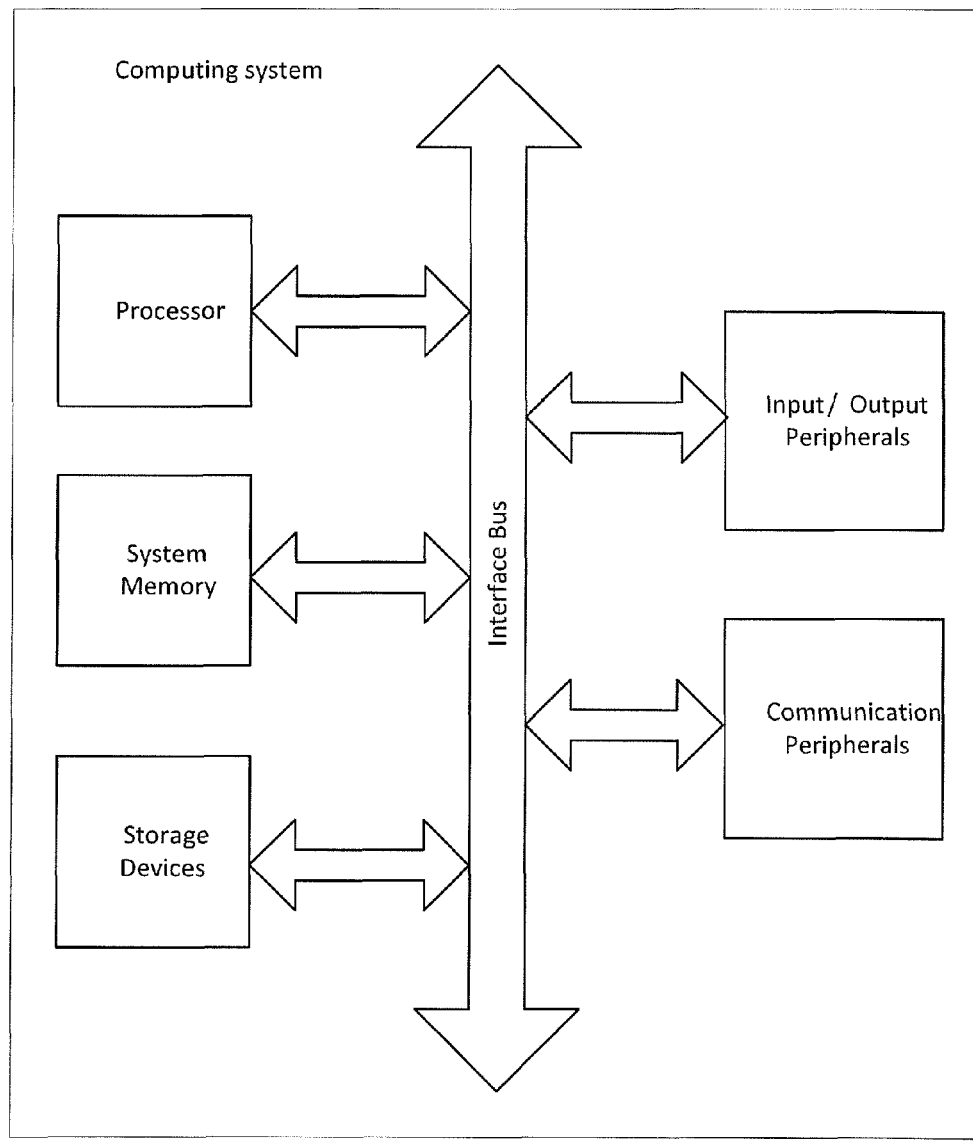
FIG. 12 is an exemplary block diagram representing a general purpose computer system in which aspects of the methods and systems disclosed herein or portions thereof may be incorporated.

The techniques described above can be implemented on a computing device associated with a user (e.g., gyroscope and accelerometer sensors implemented on a device worn by the user), a plurality of computing devices associated with a plurality of users, a server in communication with the computing device(s) (e.g., a server configured to calibrate the gyroscope and accelerometer sensors of the device worn by the user), or a plurality of servers in communication with the computing device(s). Additionally, the techniques may be distributed between the computing device(s) and the server(s). For example, the computing device may collect and transmit raw data to the server that, in turn, process the raw data to improve heading estimation. FIG. 12 illustrates an exemplary block diagram of a computing system that includes hardware modules, software module, and a combination thereof and that can be implemented as the computing device and/or as the server.

In a basic configuration, the computing system may include at least a processor, a system memory, a storage device, input/output peripherals, communication peripherals, and an interface bus. The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface that the user can use to provide input to the computing system and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a WiFi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Real-time as discussed herein refers to operations that usually occur in milliseconds, but not more than one second. The term near real-time refers to the time delay introduced by automated data processing or network transmission, between the occurrence of an event and the use of the processed data, such as for display or feedback and control purposes. For example, a near-real-time display depicts an event or situation as it existed at the current time minus the processing time, as nearly the time of the live event. Near real-time events usually occur within seconds.

What is claimed:

1. A computer-implemented method of tracking a subject and updating a path taken by the subject, the method being implemented by a computer that includes a physical processor, the method comprising:
   determining a path taken by a subject by obtaining tracking data, from a dead reckoning sensor associated with the subject, the path taken including a series of dead reckoning path points from an initial point of the subject and a current location of the subject and a distance between each set of adjacent dead reckoning path points among the series of dead reckoning path points;
   generating convex constraint data, while the subject is traveling the path taken, by obtaining data from at least one of a magnetic field sensor and a ranging sensor, wherein the convex constraint data is associated with at least one error bound; and
   applying the tracking data and the convex constraint data in a convex optimization method to update at least a portion of the path taken by the subject and to identify the current location of the subject, wherein the convex optimization method includes defining a convex objective function for one or more parameters associated with one or more of the path taken and the current location and minimizing the convex objective function based on the convex constraint data to adjust the distance for at least one set of adjacent dead reckoning path points.

2. The method of claim 1, wherein the convex constraint data further includes obtaining data from one or more of an accelerometer, a gyroscope, a global positioning system sensor, and a barometric pressure sensor.

3. The method of claim 1, wherein the ranging sensor measures ranging data between one or more of:
   the subject and an estimated location;
   the subject and a known location; and
   the subject and at least one other subject.

4. The method of claim 1, wherein the convex constraint data further includes at least one of pose constraint data and feature data.

5. The method of claim 1, further comprising propagating the convex constraint data by a motion model to produce error bounds that continue to constrain the updated path and the current location over time.

6. The method of claim 5, wherein propagating the convex constraint data is limited by at least one of other sensor data and map structural data.

7. The method of claim 6, wherein the other sensor data includes at least one of an accelerometer, a gyroscope, a global positioning system sensor, a magnetic field sensor, and a barometric pressure sensor.

8. The method of claim 6, wherein the map structural data includes at least one of a wall, a door, a building outline, and a mapped area of restricted access.

9. The method of claim 6, wherein generating the convex constraint data includes using intersections of constraints with spaces that are directly reachable by a straight line or by considering the motion model.

10. The method of claim 6, wherein the one or more parameters include one or more of heading, scale, and drift.

11. The method of claim 1, where the convex optimization method includes solving for at least one of a global offset, a rotation, a drift, and a scale.

12. The method of claim 1, further comprising, after using the convex optimization method, using a local optimization that supports enforcing non-convex constraints.

13. The method of claim 1, further comprising passing the updated path and the current location of the subject to a convex simultaneous localization and mapping algorithm, wherein the convex simultaneous localization and mapping algorithm uses convex optimization to enforce constraints on a dead reckoning track.

14. The method of claim 13, wherein the convex simultaneous localization and mapping algorithm receives a feature that has passed through a loop detector.

15. The method of claim 13, wherein the convex simultaneous localization and mapping algorithm creates an updated feature and pose pair based on at least one of:
the updated path and the current location of the subject,
a historical feature and pose pair that was previously processed by the convex simultaneous localization and mapping algorithm, and
a historical feature and pose pair associated with another tracking device.

16. The method of claim 15, further comprising processing, by a loop-closing detector, the historical feature and pose pair that was previously processed by the convex simultaneous localization and mapping algorithm.

17. The method of claim 1, wherein the convex constraint data further includes at least one of a user correction and a check-in.

18. The method of claim 1, wherein the dead reckoning sensor is at least one of an inertial sensor, an optical flow sensor, and a Doppler velocimeter.

19. A computing system used to track a trackee and updating a path taken by the trackee, the computing system comprising:
a dead reckoning sensor;
a processor in communication with the dead reckoning sensor; and
a memory coupled to the processor, the memory having stored thereon executable instructions that when executed by the processor cause the processor to effectuate operations comprising:
determining a path taken by the trackee by obtaining tracking data, from the dead reckoning sensor, the dead reckoning sensor being associated with the trackee, the path taken including a series of dead reckoning path points from an initial point of the trackee and a current location of the trackee and a distance between each set of adjacent dead reckoning path points among the series of dead reckoning path points;
generating convex constraint data, the trackee while the trackee is traveling the path taken, by obtaining data from at least one of a magnetic sensor and a ranging sensor, wherein the convex constraint data is associated with at least one error bound; and
applying the tracking data and the convex constraint data in a convex optimization method to update at least a portion of the path taken by the trackee and to identify a current location of the trackee, wherein the convex optimization method includes defining a convex objective function for one or more parameters associated with one or more of the path taken and the current location and minimizing the convex objective function based on the convex constraint data to adjust the distance for at least one set of adjacent dead reckoning path points.

20. The computing system of claim 19, wherein the convex constraint data further includes obtaining data from at one or more of an accelerometer, a gyroscope, a global positioning system sensor, and a barometric pressure sensor.

21. The computing system of claim 19, wherein the ranging sensor measures ranging data between one or more of:
the subject and an estimated location;
the subject and a known location; and
the subject and at least one other subject.

22. The computing system of claim 19, wherein the convex constraint data further includes at least one of a pose data and a feature data.

23. The computing system of claim 19, wherein the convex constraint data further includes at least one of a user correction and a check-in.

24. The computing system of claim 19, the instructions further comprising passing the updated path and the current location of the subject to a convex simultaneous localization and mapping algorithm, wherein the convex simultaneous localization and mapping algorithm uses an inertial track and associated error estimates to replace output of a Bayesian filter used in a hierarchical active ripple simultaneous localization and mapping algorithm.

25. The computing system of claim 24, wherein the convex simultaneous localization and mapping algorithm receives a feature that has passed through a loop detector.

26. The computing system of claim 24, wherein the convex simultaneous localization and mapping algorithm creates an updated feature and pose pair based on at least one of:
the updated path and the current location of the subject,
a historical feature and pose pair that was previously processed by the convex simultaneous localization and mapping algorithm, and
a historical feature and pose pair associated with another tracking device.

27. The computing system of claim 19, wherein the dead reckoning sensor is at least one of an inertial sensor, an optical flow sensor, and a Doppler velocimeter.

28. The computing system of claim 19, the instructions further comprising propagating the convex constraint data by a motion model to produce error bounds that continue to constrain the updated path and the current location of the subject over time.

29. The computing system of claim 28, wherein propagating the constraint data is limited by at least one of other sensor data and map structural data.

30. The computing system of claim 29, wherein the other sensor data includes at least one of an accelerometer, a gyroscope, a global positioning system sensor, a magnetic field sensor, and a barometric pressure sensor.

31. The computing system of claim 29, wherein the map structural data includes at least one of a wall, a door, a building outline, and a mapped area of restricted access.

32. The computing system of claim 29, wherein generating the convex constraint data includes using intersections of constraints with spaces that are directly reachable by a straight line or by considering the motion model.

33. The computing system of claim 29, wherein the one or more parameters include one or more of heading, scale, and drift.

34. The computing system of claim 19, where the convex optimization method includes solving for at least one of a global offset, a rotation, a drift, and a scale.

35. The computing system of claim 19, the instructions further comprising, after using the convex optimization method, using a local optimization that supports enforcing non-convex constraints.

\* \* \* \* \*